(12) United States Patent
Reilly et al.

(10) Patent No.: US 10,346,124 B2
(45) Date of Patent: Jul. 9, 2019

(54) AUDIO BENCHMARKING WITH SIMULATED REAL TIME PROCESSING OF AUDIO

(71) Applicant: DOLBY LABORATORIES LICENSING CORPORATION, San Francisco, CA (US)

(72) Inventors: Andrew P. Reilly, Hurlstone Park (AU); Marcus Altman, Sydney (AU); Niall Battson, Oakland, CA (US); Nicholas Engel, Darlinghurst (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 166 days.

(21) Appl. No.: 15/537,310

(22) PCT Filed: Dec. 17, 2015

(86) PCT No.: PCT/US2015/066408
§ 371 (c)(1),
(2) Date: Jun. 16, 2017

(87) PCT Pub. No.: WO2016/100683
PCT Pub. Date: Jun. 23, 2016

(65) Prior Publication Data
US 2019/0012133 A1    Jan. 10, 2019

Related U.S. Application Data

(60) Provisional application No. 62/094,200, filed on Dec. 19, 2014.

(51) Int. Cl.
*G06F 17/00* (2019.01)
*G06F 3/16* (2006.01)
(Continued)

(52) U.S. Cl.
CPC .......... *G06F 3/162* (2013.01); *G06F 11/3003* (2013.01); *G06F 11/3013* (2013.01);
(Continued)

(58) Field of Classification Search
CPC ..................... G06F 11/3467; G06F 11/3428
See application file for complete search history.

(56) References Cited

U.S. PATENT DOCUMENTS

| 7,549,069 B2 | 6/2009 | Ishihara |
| 8,086,882 B2 | 12/2011 | Shah |
(Continued)

FOREIGN PATENT DOCUMENTS

| JP | 2006-251915 | 9/2006 |
| JP | 2011-238137 | 11/2011 |

OTHER PUBLICATIONS

Kaxiras S. et al., "Comparing power consumption of an SMT and a CMP DSP for mobile phone workloads", Cases 2001, International Conference on Compilers, Architecture and Synthesis for Embedded systems, Nov. 16-17, 2001, Atlanta GA, pp. 211-220, Jan. 1, 2001. (Year: 2001).*

(Continued)

*Primary Examiner* — Joseph Saunders, Jr.

(57) ABSTRACT

In some embodiments, a method for benchmarking an audio processing algorithm ("APA") while the APA is executed in a manner simulating expected real time execution by a deployed system. Other embodiments include a method including steps of determining a synthetic APA which corresponds to a counterpart APA (intended for real use by a first deployed system), and benchmarking the synthetic APA while it is executed in a manner simulating expected real time execution of the synthetic APA by a contemplated deployed system. Other aspects include a system or device configured to implement any embodiment of the inventive (Continued)

method, or including a memory which stores data indicative of at least one synthetic APA determined in accordance with, or a benchmark generated by, an embodiment of the inventive method or steps thereof, and a computer readable medium which stores code for implementing any embodiment of the inventive method or steps thereof.

22 Claims, 2 Drawing Sheets

(51) Int. Cl.
  *G06F 11/30* (2006.01)
  *G06F 11/34* (2006.01)
  *G10L 19/26* (2013.01)
  *G06F 3/0482* (2013.01)
  *G06F 3/0484* (2013.01)

(52) U.S. Cl.
  CPC ...... *G06F 11/3062* (2013.01); *G06F 11/3428* (2013.01); *G06F 11/3457* (2013.01); *G06F 3/0482* (2013.01); *G06F 3/04847* (2013.01); *G06F 11/3409* (2013.01); *G06F 11/3414* (2013.01); *G06F 2201/805* (2013.01); *G06F 2201/865* (2013.01); *G10L 19/26* (2013.01)

(56) References Cited

U.S. PATENT DOCUMENTS

| | | | |
|---|---|---|---|
| 8,347,124 B2 | 1/2013 | Bell, Jr. | |
| 8,433,554 B2 * | 4/2013 | Wasser | G06F 17/5009 702/186 |
| 8,650,552 B1 | 2/2014 | Liao | |
| 2012/0173187 A1 * | 7/2012 | Lee | G06F 11/3414 702/123 |
| 2013/0174128 A1 | 7/2013 | Kansal | |
| 2016/0098334 A1 * | 4/2016 | Hariharakrishnan | G06F 11/3013 702/186 |

OTHER PUBLICATIONS

Lee S. H. et al., "Communication-aware task assignment algorithm for MPSoC using shared memory", Journal of Systems Architecture, Elsevier BV, NL, vol. 56 No. 7, pp. 233-241, Jul. 1, 2010. (Year: 2010).*

Ajabshir V. et al., "Fault-Tolerant Routing for Irregular-Topology-Based-Network-on-Chips", 2014 Second International Symposium on Computing and Networking, IEEE, pp. 123-129, Dec. 10, 2014. (Year: 2014).*

Ganesan K. et al., "Automatic Generation of Miniaturized Synthetic Proxies for Target Applications to Efficiently Design Multicore Processors", IEEE Transactions on Computers, IEEE Service Center, Los Alamitos, CA, US, vol. 63 10. 4, pp. 833-846, Apr. 1, 2014. (Year: 2014).*

Joshi A. et al., "Automated Microprocessor Stressmark Generation" High Performance Computer Architecture 2008, HPCA 2008, IEEE 14th International Symposium on, IEEE Piscataway, NJ, USA, pp. 229-239, Feb. 16, 2008. (Year: 2008).*

Mittal R. et al., "Empowering Developers to Estimate App Energy Consumption", ACM Aug. 22-26, 2012, Istanbul Turkey, pp. 1-11.

* cited by examiner

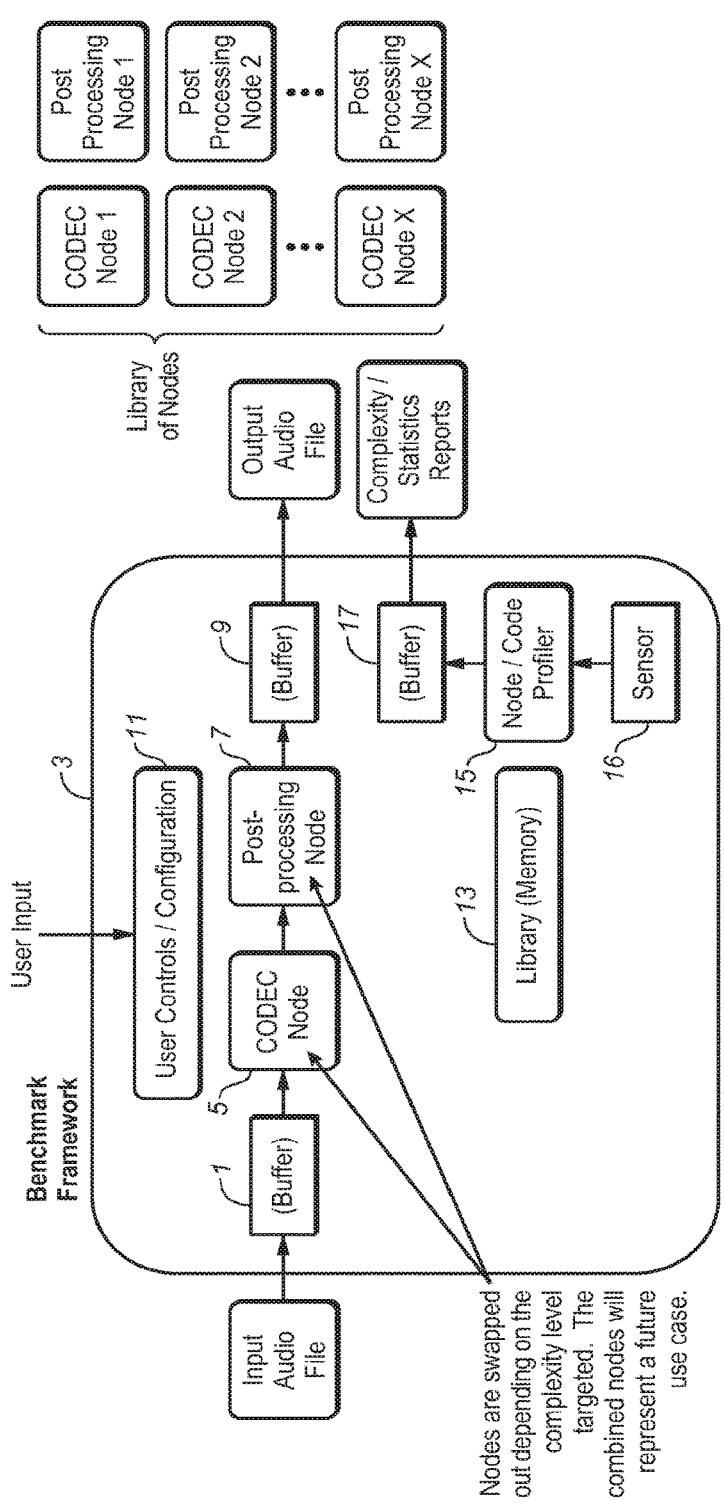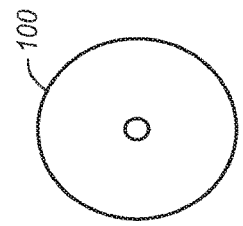

AUDIO BENCHMARKING WITH SIMULATED REAL TIME PROCESSING OF AUDIO

CROSS-REFERENCE TO RELATED APPLICATIONS

This application claims priority from U.S. provisional patent application No. 62/094,200 filed 19 Dec. 2014, which is hereby incorporated by reference in its entirety.

TECHNICAL FIELD

The invention pertains to audio signal processing, and more particularly to determination of benchmarks (e.g., data indicative of power consumption and optionally also at least one other significant characteristic) of audio processing methods. In some embodiments, a benchmark of an audio processing method is determined while the method (or a synthetic audio processing algorithm which corresponds to the method) is performed in a mode which simulates expected real time execution of the method (or an audio processing method similar thereto) by a deployed system.

BACKGROUND

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expressions "audio processor" and "audio processing unit" are used interchangeably, and in a broad sense, to denote a processor configured to process audio data. Examples of audio processing units include, but are not limited to encoders (e.g., transcoders), decoders, codecs, pre-processing systems, post-processing systems, and bitstream processing systems. Examples of audio processors include appropriately configured field-programmable gate arrays (or other configurable integrated circuits or chip sets), digital signal processors programmed and/or otherwise configured to perform pipelined processing on audio or other sound data, appropriately programmed (and/or otherwise configured) programmable general purpose processors or computers, and appropriately programmed (and/or otherwise configured) programmable microprocessor chips or chip sets.

Herein, the expressions "audio processing methods" and "audio processing algorithms" are used interchangeably, as synonyms, to denote methods implemented by audio processors, which process input audio data to generate output (processed) audio data in response to the input audio data.

A wide variety of audio processing algorithms are in commercial use to perform various types of useful processing on audio data.

It is often useful to perform benchmarking of an audio processing algorithm ("APA"), to determine a benchmark indicative of power consumption and optionally also at least one other performance characteristic (e.g., cycle complexity) of the APA as executed by (i.e., as running on) an audio processor configured to execute the APA.

Power and performance (e.g., cycle complexity) measurements of APAs running on modern audio processors, especially portable devices, are both crucially important (since power consumption affects battery life) and very difficult. The inventors have recognized that part of the difficulty stems from the way that modern processors use dynamic voltage and clock frequency scaling to minimize steady-state power consumption while still maximizing peak or burst power consumption. The inventors have further recognized that the existence of these features prevents traditional benchmarks of APAs, which are determined in a benchmarking operation with each node running in a "batch" mode (i.e., as fast as it can until processing of the relevant audio data is finished), from accurately representing the cost (e.g., power consumption) of each of the same APAs running in a "real time" mode (i.e., in the same way, at least in critical respects, that it is expected to run in real deployment.

Throughout this disclosure including in the claims, the expression that APA being benchmarked is executed (or runs) in a "real time mode" in a processor to generate processed audio, denotes that the audio processing is performed in a manner which simulates expected real time execution of the APA by a contemplated deployed system (an audio processing system to be deployed by an end user) which executes the APA to be benchmarked. For example, in some embodiments of the invention, and APA is executed in a run time mode (during benchmarking) in which the audio processing is performed only during processing intervals (each having selected duration) on bursts of audio data (with a burst of audio data undergoing processing in each processing interval) separated by intervals ("sleep intervals") of selected duration in which audio processing is not performed (each sleep interval occurring between two consecutive processing intervals) in a manner which keeps signal output buffers (which buffer the processed audio) from emptying, and which matches or is intended to match the same way the audio processing is to be performed during expected real time execution of the APA by a deployed system (at least in the respect that its average rate of audio sample processing matches the expected average rate of audio sample processing in real deployment, and optionally also in at least one other respect). Benchmarking of APAs running in a real time mode is intended to cause the resulting benchmarks to be indicative of execution of the APAs in a real audio processing framework, so that each APA being benchmarked is executed (during benchmarking) in the same way (at least in the critical respect that its average rate of audio sample processing matches the expected average rate of audio sample processing in real deployment) that it is expected to be executed in real deployment. Typically, execution in a real time mode of an APA being benchmarked simulates (e.g., by appropriate choice of burst size and sleep interval duration) variation ("throttling") of CPU voltage and/or frequency by the contemplated deployed system (e.g., throttling up to a maximum and then, if the processing continues for a sufficient duration and sufficiently rapidly that measured processor temperature rises faster than heat can be dissipated, back down to a lower value).

As more audio processing algorithms are developed for execution by mobile devices (e.g., tablets and smartphones) there is a greatly increased sensitivity to the power that products (which are programmed or otherwise configured to execute such algorithms) will consume during execution of the algorithms. This is in contrast to the demands for better and more immersive experiences that demand dramatically more sophisticated and complex audio processing algorithms, at the same time as the target hardware platforms have reached a slowing of the Moore's-law progression of ever-better performance and efficiency. It is currently very important to measure both execution time (e.g., as determined by the processing rate (e.g., in MCPS, or millions of clock cycles per second) and number of clock cycles required to process the relevant audio data) and, more importantly, power consumption of systems (especially mobile devices) which execute audio processing algorithms.

Unfortunately, just as it becomes increasingly important to make such benchmarking measurements, it is also becoming more difficult to do so. The inventors have recognized that one reason for the increasing difficulty is that hardware platforms are increasingly using aggressive processor voltage and clock scaling, which mostly makes the traditional, iterative batch mode of benchmarking inappropriate. Traditionally, an APA undergoing benchmarking would be executed back-to-back a large number of times, so that the execution time of a single iteration could be estimated accurately. On typical modern hardware such processing represents a peak computation load that will typically cause the CPU voltage and frequency to be throttled up to a maximum, and (if the test goes on for long) perhaps throttled back down as the system measures the processor temperature rising faster than the heat can be dissipated. This throttling makes conventional long-time average measurements largely meaningless. To make matters worse, the power consumption of a processor is nonlinear with voltage (and the voltage is usually scaled up to support higher CPU frequencies), because broadly speaking it follows a $V^2R$ law. The inventors have recognized that the only way to accurately measure power consumption (and complexity performance) of APAs running in a large number of modern devices is to perform the measurement with the APAs (or synthetic APAs which correspond to the APAs) with the APAs (or corresponding synthetic APAs) running in as close to their expected final, delivered form as possible. They have also recognized that this implies that benchmarking of an APA should (at least in typical circumstances) be performed with the APA (or a synthetic APA corresponding thereto) running in a real time mode which simulates expected real time execution of the APA by a deployed system (e.g., with audio processing in periodically occurring bursts on blocks of audio data, using as little of the processor's resources as possible to match an expected throughput rate in real deployment).

The inventors have also recognized that it is also important that a delivered benchmark of an APA be determined with usage of processing system memory, both in size and access patterns, similar to that expected to occur in expected real deployment of the benchmarked algorithm (e.g., typical intended use of the audio processing code to be delivered to the intended users). Underlying this recognition is their recognition that the relatively large memory space required to store and process many channels of audio data, with selectivity for low frequencies (and therefore with considerable buffering and latency) often causes end user implementations to have worse than the optimal performance achievable in a benchmarking operation (e.g., due to the relatively high cost of cache misses, both in direct power consumed and in processor stall cycles which occur in real deployment).

The inventors have also recognized that it would be desirable to provide and disseminate a system for benchmarking an APA as it would run on each of one or more deployed audio processing systems (or computer-implementable code for programming a system to perform such benchmarking), without actually disseminating the APA. For example, the APA may include secrets so that it is not desired to disseminate the actual APA. In view of this recognition, an aspect of some embodiments of the present invention is a method and system for benchmarking a "synthetic" APA as it would run on each of one or more deployed audio processing systems (or computer-implementable code for programming a system to perform such benchmarking), where the synthetic APA corresponds to and emulates (as described herein) a real (functional) APA, where the functional APA (or variations thereon) is intended for real use (running on a deployed system) and where it is desired to benchmark the functional APA (or a variation thereon) as it would run on the deployed system. Such a synthetic APA may be freely disseminated (e.g., included in computer-implementable code for programming a system to perform an embodiment of the inventive benchmarking method), while the corresponding functional APA is maintained as a secret.

BRIEF DESCRIPTION OF EMBODIMENTS OF THE INVENTION

In a class of embodiments, the inventive method is a method for benchmarking an audio processing algorithm ("APA") while the APA is executed in a manner which simulates (e.g., in accordance with at least one benchmarking parameter determined from selectable benchmarking parameters) expected real time execution of the APA by a contemplated deployed system (an audio processing system to be deployed by an end user). The method includes steps of:

(a) operating an audio processor to execute the APA, including by processing audio data, in a manner which simulates expected real time operation of the contemplated deployed system which executes the APA; and (b) while performing step (a), generating benchmarking data indicative of at least one performance characteristic of the APA during processing of the audio data, whereby the benchmarking data determine a benchmark of the APA.

Step (b) typically includes measurement of power consumption by the audio processor during the processing of the audio data, and the benchmark is indicative of the power consumption. In some embodiments, the APA to be benchmarked is a synthetic audio processing algorithm (sometimes referred to herein as a "node" or "synthetic APA") which corresponds to a counterpart APA (a functional APA, intended for real use by a deployed system). The synthetic APA ("node") is such that, when the synthetic APA is benchmarked by a processor configured to perform an embodiment of the inventive benchmarking method (in accordance with a set of benchmarking parameters), the resulting benchmark matches (is at least substantially the same as) the benchmark which would be determined by the same processor as a result of benchmarking the corresponding counterpart APA in accordance with the same benchmarking parameters. The synthetic APA is expected to be useful by a variety of users, prospective users, and developers of counterpart APAs (or APAs which are larger than the synthetic APA and include at least one counterpart APA which corresponds to the synthetic APA). In some embodiments, benchmarking of an APA is performed conveniently, as a result of user selection of at least one selectable benchmarking parameter, in a manner (sometimes referred to herein as a "real time mode") which simulates expected real time operation of a contemplated deployed system running the APA (or in the case that the APA is a node, a contemplated deployed system running a counterpart APA which corresponds to the node). This allows realistic benchmarking measurements to be made, while the benchmarking framework is still relatively portable across platforms and contemplated (target) deployed processors.

Typically, the APA being benchmarked is executed in a burst mode, in the sense that it processes blocks (bursts) of audio data in a sequence of processing intervals separated by sleep intervals, wherein a block of the audio data is processed during each of the processing intervals, and no audio data is processed during the sleep intervals. Selectable benchmarking parameters may determine the duty cycle and/or block size, typically to enable a user to select parameters which cause the average throughput rate and block size (of the burst mode benchmarking operation) to match that expected when a contemplated deployed system runs the APA which is benchmarked or an APA similar thereto (or in the case that the APA is a node, a counterpart APA which corresponds to the node which is benchmarked). For example, a menu of selectable benchmarking parameters may indicate a set of selectable synthetic APAs (having different levels of complexity), and selection of one of the synthetic APAs for benchmarking may determine the duty cycle and block size to be employed during the benchmarking (where the duty cycle and block size have been predetermined so that execution of the selected synthetic APA during the benchmarking emulates execution of the selected synthetic APA by a contemplated deployed system). In another example, a menu of selectable benchmarking parameters indicates both a set of selectable synthetic APAs (typically having different levels of complexity), and a set of selectable duty cycle and/or block size parameters (so that the user can select a desired combination of the APA to be benchmarked and duty cycle and/or block size parameters to be employed during the benchmarking to emulate execution of the APA by a contemplated deployed system). The burst mode operation could (and typically would) simulate execution of the APA (or an APA similar thereto) by a contemplated deployed system with expected throttling of processor (e.g., CPU) voltage and/or processing rate or frequency (e.g., expected throttling up to a maximum, followed by throttling back down if and when measured processor temperature rises faster than heat can be dissipated). Typically, the burst mode operation comprises a sequence of short processing intervals (in which small blocks of audio data are processed) evenly spread through time in order to keep signal output buffers from emptying.

In preferred embodiments, the benchmarking method (and processor programmed and otherwise configured to perform the method) provides user controls which enable a user to perform benchmarking of an APA (e.g., a node) conveniently and in a manner (sometimes referred to herein as a "real time mode") which simulates (e.g., simulates or mimics as a result of user choice of user-specifiable benchmarking parameters) expected real time operation of a contemplated deployed system running the APA (or in the case that the APA is a node, a contemplated deployed system running a counterpart APA which corresponds to the node). The resulting benchmarks are thus usable to assess expected operation (in real deployment) of systems which execute the benchmarked APA (or APAs similar thereto). In preferred embodiments, the method (and processor configured to perform the method) is useful to benchmark a variety of different APAs (e.g., a variety of selectable combinations of a selected audio decoding node, which processes an input audio file, and a selected audio post processing node (which processes the output of the decoding node) running in sequence with the post processing node). In some embodiments, a user control is provided which allows selection of any one of at least two available audio decoding nodes (algorithms of a type normally implemented by an audio codec), and/or any one of at least two available audio post processing nodes (algorithms of a type normally implemented by an audio post-processor), and/or any one of at least two available combinations of audio decoding nodes and audio post processing nodes (e.g., an audio decoding node running in sequence with an audio post processing node).

In a second class of embodiments, the inventive method includes steps of determining a synthetic audio processing algorithm (sometimes referred to herein as a "node" or "synthetic APA") which corresponds to a counterpart APA (a functional APA, intended for real use by a contemplated first deployed system), and determining a benchmark of the node (or an APA including the node) as a result of benchmarking the node while said node (or APA including said node) is executed by a benchmarking system in a manner which simulates (e.g., as a result of user selection of at least one selectable benchmarking parameter) expected real time operation of a contemplated second deployed system which executes the node (or APA including the node)

The contemplated second deployed system is an audio processing system contemplated for deployment (or expected to be deployed) by an end user, which can be but need not be identical (or at least substantially identical) to the first deployed system. The node is determined such that, when the node is benchmarked by a processor configured to perform an embodiment of the inventive benchmarking method (using a set of benchmarking parameters), the resulting benchmark matches (is at least substantially the same as) the benchmark which would be determined by the same processor as a result of benchmarking the corresponding counterpart APA using the same benchmarking parameters. Thus, the node can be determined so as to correspond to a secret counterpart APA (which is desired to be kept as a secret). The node can then be disseminated to users (with software for programming a system to perform an embodiment of the inventive benchmarking method) to allow benchmarking of user-determined counterpart APAs which correspond (or are similar) to the node and to the secret counterpart APA and are intended to run on a variety of contemplated deployed systems (or benchmarking of APAs including such user-determined counterpart APAs), without actually disseminating the secret counterpart APA Typically, during the benchmarking step of a method in the second class, the node (or APA including the node) being benchmarked is executed in a burst mode comprising a sequence of processing intervals separated by sleep intervals, wherein a block of audio data is processed during each of the processing intervals, and no audio data is processed during the sleep intervals. The selectable benchmarking parameters may determine the duty cycle (ratio of duration of a processing interval to the subsequent sleep interval) and/or block size, typically so that the average throughput rate and block size (of the burst mode operation) match that expected when the contemplated second deployed system runs the node (or a counterpart APA which corresponds to the node).

The node (synthetic APA) determined by a method in the second class may include (or even consist primarily of) calls to code, for implementing signal processing functions, which is assumed to be stored in a library (in a memory of the system), so that execution of the node by a benchmarking system includes calls to at least some of the code (stored in a memory of the system) which is executed to cause the system to perform a sequence of the signal processing functions. In this case, execution of the node (by the benchmarking system) preferably mimics the dynamic workload and memory requirements of execution of the corresponding counterpart APA (e.g., the number and sequence of calls by the node to processing functions in a library of the benchmarking system matches the number and sequence of calls by the corresponding counterpart APA to corresponding processing functions in a library of the first deployed system). Examples of signal processing functions which may be called by APAs include (but are not limited to) FFTs, DCTs, DSTs, IIR and FIR filters, matrix and vector math operations, and scalar math operations (e.g., multiply-accumulates, additions, and shifts).

In some embodiments which determine and/or benchmark a "node" (synthetic APA), the node emulates a complete reference APA (reference code), in the sense that execution of the node emulates at least important ones of the performance characteristics of execution, by the same processor, of the reference code. For example, the reference APA may be a decoding method or an audio post-processing method (or a decoding method, and an audio post-processing method which processes the decoded audio output of the decoding method).

In some embodiments which determine and/or benchmark a "node" (synthetic APA), the node is determined so as to correspond to a secret counterpart APA (which is desired to be kept as a secret). The node can then be disseminated to users (with software for programming a system to perform an embodiment of the inventive benchmarking method) to allow benchmarking of user-determined counterpart APAs which correspond (or are similar) to the node and to the secret counterpart APA (or benchmarking of APAs including such user-determined counterpart APAs), and are intended to run on a variety of contemplated deployed systems. This can be accomplished without actually disseminating the secret counterpart APA. For example, in some embodiments which determine and/or benchmark a "node" (synthetic APA), the node may be written to call signal processing functions (assumed to be stored in a library) in a similar way as does the reference code (where the reference code may be desired to be kept as a secret), but with the key difference that the node simulates the performance characteristics of the reference code without actually implementing the same algorithms as does the reference code. In this way, the node (and the method of benchmarking the node) can be modified (e.g., improved) independently of the reference code, and the node can be more freely distributed than the reference code.

A secret APA may have a set of parameters that vary its behavior and functionality, which can affect its performance (e.g., power consumption and/or another complexity attribute). For example an APA which performs the Dolby Digital Plus decoding method (or another decoding method) may have a variable computational/power load based upon its output mode (or other) decoding settings. Similarly an audio post-processing APA may vary its load depending upon which features are enabled. In some embodiments in which a library of selectable synthetic nodes is provided (e.g., the library of X selectable CODE nodes and X selectable post-processing nodes shown in FIG. 2), the selectable nodes may be or include synthetic nodes that correspond to secret APAs, and/or key (e.g., typical or important) configurations of at least one secret APA. For example, one secret APA may have different operating modes, and an embodiment of the invention may provide at least two selectable synthetic nodes, each of which corresponds to (and emulates) a different one of these modes. One implementation of the latter embodiment may provide just one set of synthetic APA code for each class (or sub-class) of corresponding nodes (for example, one class of nodes may be CODEC nodes, e.g., the X selectable CODEC nodes of FIG. 2, and another class may be post-processing nodes, e.g., the X selectable post-processing nodes of FIG. 2), and a hard coded software configuration parameter (e.g., specified by a benchmarking system user via a user interface of the system) may cause the benchmarking system to implement (and benchmark) any one of a number of different instantiations of (or variations on) the synthetic APA code (corresponding to different synthetic nodes in one of the classes).

In some embodiments, the inventive benchmarking method is implemented by an audio processor programmed (in accordance with the invention) with benchmarking software of a type conventionally referred to "command line only" software (i.e., the programmed processor executes the benchmarking software to perform benchmarking in response to user commands entered as lines of text). In other embodiments, the processor is programmed (in accordance with the invention) with benchmarking software which implements a graphic user interface (GUI) usable by the user to control performance of the inventive benchmarking method. For example, the inventive system may be implemented by programming a conventional processor (e.g., smart phone or other mobile device) with an embodiment of benchmarking software which includes a GUI usable to control performance of the inventive method, although the operating system of the conventional processor does not permit running benchmarking software with a command line interface. In the latter example, the benchmarking software would itself implement a GUI, and the user would employ this GUI to control the programmed system to perform benchmarking in accordance with the invention.

In some embodiments, the inventive benchmarking method and system provides one or more of the following user controls:

at least one control which allows user selection (preferably conveniently and easily) of selectable versions of the APA to be benchmarked (e.g., versions with selected audio processing operations enabled ("on") or disabled ("off") but with everything else the same), and measurement of power consumed during execution of each selected version of the APA during benchmarking;

at least one complexity control that allows user selection of an APA to be benchmarked from a menu of selectable APAs having different levels of complexity. The user is typically provided with an indication of the complexity (e.g., workload and memory footprint) of each selectable APA, and the menu may present the selectable APAs in complexity order (e.g., an indication is provided of representative workloads and memory footprints of the APAs in complexity order). The selectable APAs may correspond to (e.g., they may be synthetic APAs which emulate) a range of technologies and typical use-cases, and the menu of selectable APAs may provide (or enable provision of) a capability level description of target processors (audio processors which are expected to be deployed by end users) which indicates which level of technology complexity can be accommodated efficiently by each target processor and which target processors (if any) may have unacceptable performance (when running specified APAs) due to excessive memory bus cycles or other factors.

Other aspects of the invention include a processor programmed and otherwise configured to perform any embodiment of the inventive benchmarking method, a system or device configured (e.g., programmed) to implement any embodiment of the inventive method (e.g., an appropriately programmed general purpose processor, computer system, or mobile device), a system or device including a memory (e.g. a buffer) which stores (e.g., in a non-transitory manner) data indicative of at least one synthetic APA determined in accordance with, or a benchmark (i.e., data indicative of a benchmark) generated by, any embodiment of the inventive method or steps thereof, and a computer readable medium (e.g., a disc) which stores code (e.g., in a non-transitory manner) for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

BRIEF DESCRIPTION OF THE DRAWINGS

FIG. 2 is a simplified block diagram of a processor configured in accordance with an embodiment of the invention to perform benchmarking of an APA. The APA may be a synthetic APA comprising a codec node (executed by subsystem 5) and a post-processing node (executed by subsystem 7), or a synthetic APA comprising only a codec node (executed by subsystem 5), or a synthetic APA comprising only a post-processing node (executed by subsystem 7), or another APA.

FIG. 3 is a simplified elevational view of a computer-readable medium (a disc) which stores code (in a non-transitory manner) for implementing an embodiment of the inventive benchmarking method.

NOTATION AND NOMENCLATURE

Figure 1:
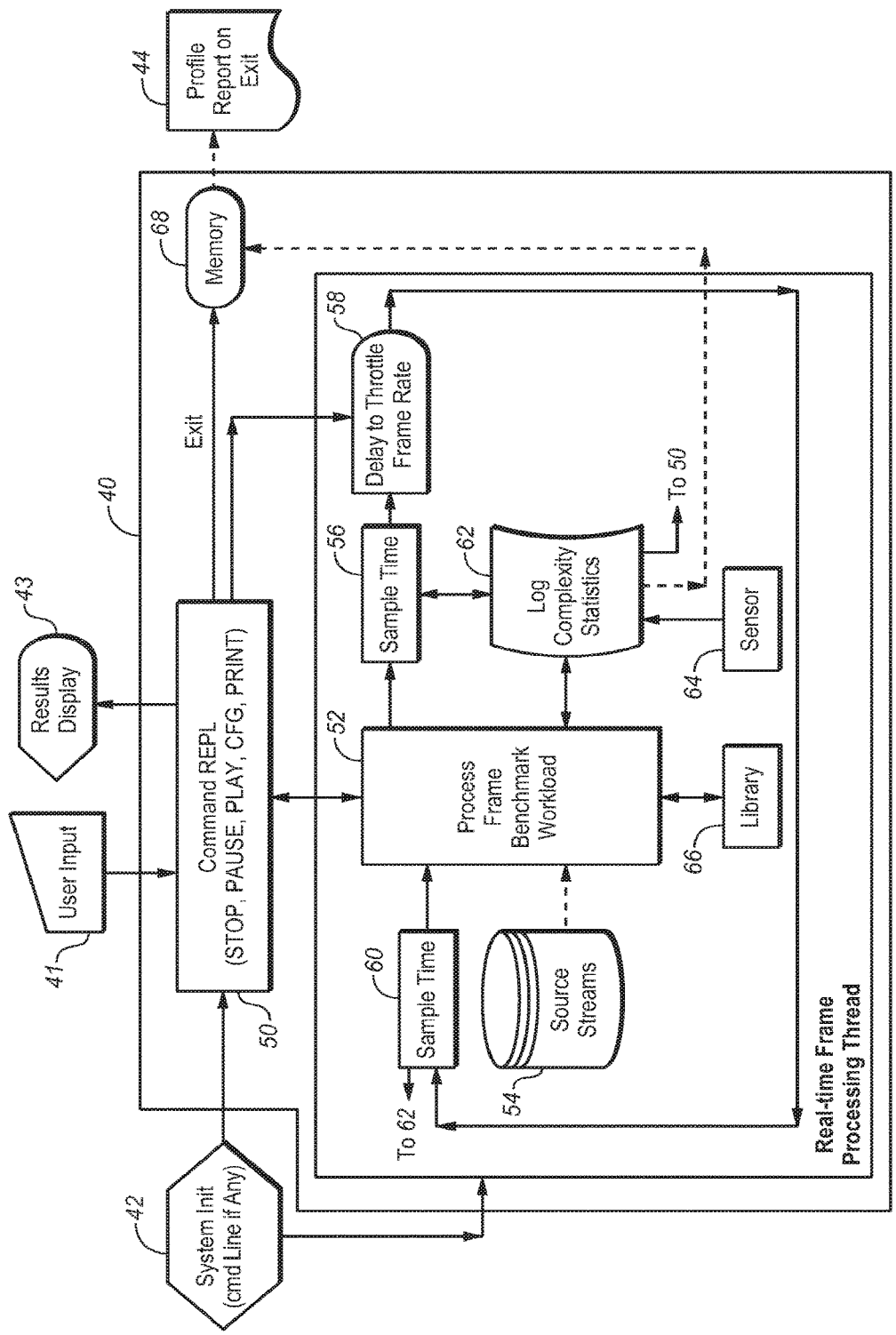
FIG. 1 is a simplified block diagram of an audio data processing system, including processor 40 which is configured in accordance with an embodiment of the present invention to perform benchmarking of an APA.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Throughout this disclosure including in the claims, the following expressions have the following definitions:

speaker and loudspeaker are used synonymously to denote any sound-emitting transducer. This definition includes loudspeakers implemented as multiple transducers (e.g., woofer and tweeter);

speaker feed: an audio signal to be applied directly to a loudspeaker, or an audio signal that is to be applied to an amplifier and loudspeaker in series;

channel (or "audio channel"): a monophonic audio signal. Such a signal can typically be rendered in such a way as to be equivalent to application of the signal directly to a loudspeaker at a desired or nominal position. The desired position can be static, as is typically the case with physical loudspeakers, or dynamic;

audio program: a set of one or more audio channels (at least one speaker channel and/or at least one object channel) and optionally also associated metadata (e.g., metadata that describes a desired spatial audio presentation); and render: the process of converting an audio program into one or more speaker feeds, or the process of converting an audio program into one or more speaker feeds and converting the speaker feed(s) to sound using one or more loudspeakers (in the latter case, the rendering is sometimes referred to herein as rendering "by" the loudspeaker(s)). An audio channel can be trivially rendered ("at" a desired position) by applying the signal directly to a physical loudspeaker at the desired position, or one or more audio channels can be rendered using one of a variety of virtualization techniques designed to be substantially equivalent (for the listener) to such trivial rendering. In this latter case, each audio channel may be converted to one or more speaker feeds to be applied to loudspeaker(s) in known locations, which are in general different from the desired position, such that sound emitted by the loudspeaker(s) in response to the feed(s) will be perceived as emitting from the desired position.

DETAILED DESCRIPTION OF EMBODIMENTS OF THE INVENTION

Examples of embodiments of the invention will be described with reference to FIGS. 1 and 2.

FIG. 1 is a simplified block diagram of an audio data processing system, including audio processor 40 which is configured in accordance with an embodiment of the present invention to perform benchmarking in accordance with an embodiment of the invention. The FIG. 1 system includes user interface subsystem 50, memory 54 (which stores audio data to be processed by subsystem 52 during benchmarking), audio processing subsystem 52, benchmark data generation subsystem 62, processing time sampling subsystems 56 and 60, processing delay control subsystem 58, sensor subsystem 64, memory 66 (which stores code for implementing signal processing functions which may be called by subsystem 52 during execution of an APA undergoing benchmarking), and memory 68 (which stores benchmark data generated during benchmarking operation), connected as shown. Processor 40 may be a general purpose processor (or other processor) which has been configured to perform benchmarking in accordance with an embodiment of the invention by coupling sensor subsystem 64 to a circuit element (typically the battery or other power supply) of the processor to measure power consumption (e.g., as described below), programming subsystems 50, 52, 56, 58, 60, 62 and 64 with software which enables the programmed processor 40 to perform the benchmarking, and storing required data and code in elements 54 and 66.

User interface 50 is operable in response to user input 41 to control benchmarking operation of the FIG. 1 system, including by configuring subsystems 52, 62, and 58 to perform benchmarking in response to user input 41 (indicative of commands) and/or in accordance with default settings. User interface 50 is operable to cause display 43 to display benchmark data generated in subsystem 62, menus indicative of user selectable parameters (e.g., audio processing algorithms ("APAs") which are selectable for benchmarking), and typically also other information regarding system configuration and status. The system commences a benchmarking operation in response to a start command 42. In response to an "exit" command, the system terminates a benchmarking operation and outputs the most recently updated version of a report (profile report 44) indicative of benchmark data generated during the operation.

Memory 54 may store (in non-transitory manner) audio data indicative of at least a segment of an encoded multichannel audio program to be processed by an APA (implemented by subsystem 52) during benchmarking of the APA. In operation, a bitstream indicative of a sequence of blocks of the audio data (which is in turn indicative of the program or program segment) is output from memory 54 to benchmarking processing subsystem 52.

In operation of the FIG. 1 system to perform typical embodiments of the inventive method, processor 40 (i.e., subsystem 52 of processor 40) executes the APA in a run time mode (during benchmarking of the APA) in which subsystem 52 performs audio processing only during processing intervals (each having selected duration) on bursts of the audio data (typically each burst is one of the blocks), with a burst (e.g., block) of audio data undergoing processing in each processing interval. The processing intervals are separated by intervals ("sleep intervals") of selected duration (determined by subsystem 58) in which subsystem 52 does not perform audio processing. Each sleep interval occurs between two consecutive processing intervals, typically in a manner which keeps subsystem 52's signal output buffers (which buffer the processed audio) from emptying, and which matches or is intended to match the same way the audio processing is to be performed during expected real time execution of the APA by a deployed system (at least in the respect that its average rate of audio sample processing matches the expected average rate of audio sample processing in real deployment, and optionally also in at least one other respect).

During benchmarking operation, subsystem 56 measures (identifies) the end time of each processing interval and data indicative of each end time is provided to subsystem 62. At the end of each processing interval, subsystem 58 causes the system to cease audio processing (i.e., causes the system to enter a sleep interval) for the selected sleep interval duration, thereby throttling the average audio data frame rate at which the system performs audio processing. During benchmarking operation, subsystem 60 measures (identifies) the end time of each sleep interval (i.e., the start time of the next processing interval) and data indicative of each such processing interval start time is provided to subsystem 62.

During benchmarking, the APA being executed by subsystem 52 may assert calls to code, for implementing signal processing functions, which is stored (as a library) in memory 66. Thus, execution of the APA by subsystem 52 may include a sequence of calls to code stored in memory 66, and such code is then executed by subsystem 52 to perform a sequence of the signal processing functions.

During benchmarking, sensor subsystem 64 measures the power consumed by processor 40 during each processing interval (or each processing interval and each sleep interval), and data indicative of the power consumption is provided from subsystem 64 to subsystem 62. In typical embodiments, subsystem 64 includes a current-sensing resistor coupled in series with processor 40's power source (typically a battery). With the resistor so coupled with the power source, subsystem 64 monitors, at a sufficiently high sample rate, the voltages across both the load and the resistor. After calibrating the voltage across the current sense resistor into equivalent current, a sample-by-sample average of the product of load voltage and current is calculated on the captured data to produce an estimate of the average power delivered to the load.

Subsystem 62 generates benchmark data indicative of a benchmark of the APA being executed (typically in burst fashion) by subsystem 52 during a benchmarking operation. The benchmarking data is typically updated from time to time during benchmarking (e.g., after each processing interval) and the most recently updated set of benchmarking data is asserted to user interface 50 (so that it can be displayed by display 43) and stored in memory 68. In response to an "exit" command, the system terminates the benchmarking operation and outputs the most recently updated version of the benchmarking data (typically in the form of a profile report 44 indicative of the benchmark data).

FIG. 2 is a simplified block diagram of an audio processor (programmed audio processor 3) which is programmed with software (and otherwise configured) to perform an embodiment of the inventive benchmarking method to perform benchmarking of an APA. The APA is a synthetic APA comprising a codec node (executed by subsystem 5) and an audio post-processing node (executed by subsystem 7). Subsystem 5 (when enabled) is coupled and configured to perform an operation which emulates a decoding operation (a codec node, which is typically a user-selected codec node) on input audio (which is encoded audio data). Subsystem 7 (when enabled) is coupled and configured to perform an operation which emulates audio post-processing (an audio post-processing node, which is typically a user-selected audio post-processing node) on processed audio generated by enabled subsystem 5 (or on input audio, in the case that subsystem 5 is disabled). Subsystems 5 and 7 together comprise (or each of subsystems 5 and 7 individually, if one of them is disabled, comprises) an audio processing subsystem of the FIG. 2 system.

The software programs processor 3 to implement user interface and control subsystem 11, which configures the processor to perform a selected one of a number of available benchmarking operations (each in accordance with an embodiment of the invention) in response to user input (indicative of commands) entered to processor 3 and/or in accordance with default settings. Subsystem 11 is operable to control benchmarking operation of the programmed processor, including by configuring subsystems 5, 7, and 15 to perform benchmarking in response to user input and/or in accordance with default settings. Typically, a display is coupled to processor 3, for use in displaying benchmark data generated in profiling subsystem 15, menus indicative of user selectable parameters (e.g., codec nodes and post-processing nodes which may be selected for execution by subsystems 5 and 7 and thus for benchmarking), and other information regarding system configuration and status. The system commences a benchmarking operation in response to a start command. In response to an exit command, the system terminates a benchmarking operation and outputs the most recently updated version the benchmark data generated by subsystem 15 (and stored in a non-transitory manner in buffer 17) during the operation.

Processor 3 of FIG. 2 also includes buffer 1 (which stores in a non-transitory manner audio data to be processed by subsystem 5 and/or subsystem 7 during benchmarking), sensor subsystem 16, memory 13 (which stores code for implementing signal processing functions which may be called by subsystem 5 and/or subsystem 7 during execution of an APA undergoing benchmarking), and buffer 9 (which stores in a non-transitory manner processed audio data which has been processed by each enabled one of subsystems 5 and 7 during benchmarking operation), connected as shown. Processor 3 may be a general purpose processor (or other processor) which has been configured to perform benchmarking in accordance with an embodiment of the invention by coupling sensor subsystem 16 to a circuit element (typically the battery or other power supply) of the processor to measure power consumption (e.g., as described below), programming subsystems 5, 7, 11, and 15 with software which enables the programmed processor to perform the benchmarking, and required data and code are stored in element 13.

In operation of the FIG. 2 system to perform benchmarking in accordance with an embodiment of the invention, a synthetic APA (implemented by subsystem 5 and/or subsystem 7) processes audio data indicative of at least a segment of an encoded multichannel audio program, and the synthetic APA is benchmarked. Typically, a bitstream indicative of a sequence of blocks of the audio data (which is in turn indicative of the program or program segment) is asserted from buffer 1 to subsystem 5.

In typical embodiments, enabled subsystem 5 executes a selected codec node in a run time mode (during benchmarking) in which subsystem 5 performs audio processing (emulating decoding) only during processing intervals (each having selected duration) on bursts of the audio data (typically each burst is one of the blocks), with a burst (e.g., block) of audio data undergoing processing in each processing interval. The processing intervals are separated by intervals ("sleep intervals") of selected duration in which subsystem 5 does not perform audio processing. Each sleep interval occurs between two consecutive processing intervals, typically in a manner which keeps subsystem 5's signal output buffers (which buffer the processed audio) from emptying, and which matches or is intended to match the same way the audio processing is to be performed during expected real time execution of the node by a deployed system (at least in the respect that its average rate of audio sample processing matches the expected average rate of audio sample processing in real deployment, and optionally also in at least one other respect).

Also in typical embodiments, enabled subsystem 7 executes a selected post-processing node in a run time mode (during benchmarking) in which subsystem 7 performs audio processing which emulates post-processing only during processing intervals (each having selected duration) on bursts of processed audio data generated in (and output from) enabled subsystem 5 (or on bursts of input audio passed through subsystem 5, in the case that processing by subsystem 5 is disabled). Typically, each burst is a block. A burst (e.g., block) of audio data undergoes processing in each processing interval. The processing intervals are separated by intervals ("sleep intervals") of selected duration in which subsystem 7 does not perform audio processing. Each sleep interval occurs between two consecutive processing intervals, typically in a manner which keeps subsystem 7's signal output buffers (which buffer the processed audio) from emptying, and which matches or is intended to match the same way the audio processing is to be performed during expected real time execution of the node by a deployed system (at least in the respect that its average rate of audio sample processing matches the expected average rate of audio sample processing in real deployment, and optionally also in at least one other respect).

During benchmarking, the synthetic APA being executed by subsystem 5 and/or subsystem 7 may assert calls to code, for implementing signal processing functions, which is stored (as a library) in memory 13. Thus, execution of the synthetic APA may include a sequence of calls to code stored in memory 13, and such code is then executed by subsystem 5 (and/or subsystem 7) to perform a sequence of the signal processing functions.

During benchmarking, sensor subsystem 16 measures the power consumed by processor 3 during each processing interval (or each processing interval and each sleep interval), and data indicative of the power consumption is provided from subsystem 16 to subsystem 15. In typical embodiments, subsystem 16 includes a current-sensing resistor coupled in series with processor 3's power source (typically a battery). With the resistor so coupled with the power source, subsystem 16 monitors, at a sufficiently high sample rate, the voltages across both the load and the resistor. After calibrating the voltage across the current sense resistor into equivalent current, a sample-by-sample average of the product of load voltage and current is calculated on the captured data to produce an estimate of the average power delivered to the load.

Processor 3 is also programmed with software which implements profiling subsystem 15 (node/code profiler). In benchmarking operation, subsystem 15 processes benchmarking data generated as a result of operation of each enabled one of subsystems 5 and 7 to generate benchmarking output data (identified in FIG. 2 as "Complexity/Statistics Reports"). The benchmarking output data is indicative of a benchmark of the synthetic APA executed (typically in burst fashion) by each enabled one of subsystems 5 and 7. The benchmarking output data is typically updated from time to time during benchmarking (e.g., after each processing interval) and the most recently updated set of benchmarking data is asserted to user interface 11 (so that it can be displayed by a display) and stored in buffer 17. In response to an exit command, the system terminates the benchmarking operation and outputs the most recently updated version of the benchmarking output data (typically in the form of a Complexity/Statistics profile report indicative of the benchmark output data).

The embodiment of FIG. 2 supports benchmarking of a selected audio decoding node (a synthetic APA, executed by subsystem 5, which emulates a decoding process of a type normally implemented by an audio codec), and/or benchmarking of a selected audio post processing node 7 (a synthetic APA, executed by subsystem 7, which emulates an audio processing algorithm of a type normally implemented by an audio post-processor), and/or a combination of a selected audio decoding node (which processes blocks of input audio asserted from buffer 1 to subsystem 5, typically on a block by block basis) and a selected audio post processing node (which processes each processed block of audio which is output from subsystem 5 in response to a block of input audio) running in sequence with the audio decoding node. Operation of each enabled one of subsystems 5 and 7 in response to an input audio file results in generation of an output audio file. In operation, one or both of subsystems 5 and 7 may call subroutines which have been (or other code which has been) pre-stored (as a library) in memory 13.

A typical implementation of subsystem 11 is responsive to user input to implement a set of user controls (which may be implemented using a GUI, or as lines of text entered to a command line interface). For example, the user may have a play/stop control (where "play" initiates a benchmarking operation), and optionally controls for selecting various modes of benchmarking operation (e.g., controls allowing adjustment of the load and memory footprint to simulate processing several different channel configurations). In an exemplary implementation, subsystem 11 provides user controls which include the following:

User Control Purpose t,?
Complexity user dial
   Changes the complexity and/or type of the synthetic APA to be performed on an input audio file by programmed processor 3 (e.g., by selecting combinations of a selected codec node and a selected audio post-processing node from a menu, in a manner described elsewhere herein),
ON/OFF
   Turns off or on each codec node and audio post-processing node which can be benchmarked (e.g., enables execution of a codec node by subsystem 5 and disables execution of an audio post-processing node by subsystem 7 during the benchmarking operation, or enables both execution both of a codec node by subsystem 5 and execution of an audio post-processing node by subsystem 7 during the benchmarking operation),
Start
   Starts execution of the benchmark operation specified by the complexity user dial and ON/OFF controls,
Pause
   Pauses execution of benchmarking and causes output of (e.g., prints to a display screen) the latest version of the benchmarking output data,
Stop
   Completely stops execution of benchmarking,
Complexity Stats Report Print
   Causes output (e.g., prints to a display screen) the latest version of the benchmarking output data,
Complexity
   Outputs the latest version of the benchmarking output data (from buffer 17)
Stats Report Output
   to a file,
Input file specification
   Specifies path of the input audio file being used.

In some embodiments, user controls are provided (e.g., by user interface subsystem 50 of FIG. 1, or by subsystem 11 of FIG. 2) which allow a user to control the duty cycle with which blocks of audio data undergoing audio processing (in a cycle which includes a processing interval followed by a sleep (non-processing) interval, with one block being processed in each processing interval), and the size of each block, regardless of the audio sample rate. For example, if the benchmarking is to simulate real time execution of the APA (being benchmarked) by a specific contemplated deployed system (e.g., a mobile device with an Android operating system), an audio block size of X (where X may be equal to 5 ms, in the case that the deployed system is the mobile device having the Android operating system) may be preferred regardless of sample rate, and the duty cycle (ratio of duration of each processing interval to duration of the following sleep interval) may be selected so that the overall average processing rate during benchmarking matches that expected in real time operation of the deployed system. The sample rate is usually determined by the clock rate of the output audio in a real world system. For example, audio is typically played at 48000 samples per second. Using the example of a mobile device having an Android operating system, during the performance of audio benchmarking using such a device, the device might be controlled to process audio in blocks of 5 ms duration (which is 200 samples at 48 Khz). In this case, the period is 5 ms, and the duty cycle is the processor time required to do the APA processing on the 200 samples, divided by the remaining time of the period. The remaining time of the period is the sleep interval.

In some embodiments, benchmarking in accordance with the invention (e.g., an audio processor programmed in accordance with the invention with benchmarking software) is controllable to perform benchmarking of a selected decoding node or a selected post processing node individually (e.g., in subsystem 5 or 7 of FIG. 2), or both a selected decoding node and a selected post processing node (e.g., in subsystems 5 and 7 of FIG. 2) running concurrently.

In typical operation, the FIG. 1 (or FIG. 2) system performs an embodiment of the inventive method for benchmarking an APA, while the APA is executed by the FIG. 1 (or FIG. 2) system in a manner which simulates (e.g., as a result of user selection of selectable benchmarking parameters) expected real time execution of the APA (or an APA similar thereto) by a contemplated deployed system (an audio processing system to be deployed by an end user). In some embodiments, the APA which is benchmarked is a synthetic APA (sometimes referred to herein as a "node") which corresponds to a counterpart APA (a functional APA, intended for real use by a deployed system). The synthetic APA is such that, when the synthetic APA is benchmarked by the system (in accordance with a set of predetermined or user-specified benchmarking parameters), the resulting benchmark matches (is at least substantially the same as) the benchmark which would be determined by the same system as a result of benchmarking the corresponding counterpart APA in accordance in accordance with the same benchmarking parameters.

Typically, during benchmarking operation of the FIG. 1 (or FIG. 2) system, the APA being benchmarked is executed in a burst mode in the sense that it processes blocks (bursts) of audio data, in a sequence of processing intervals separated by sleep intervals, wherein a block of the audio data is processed during each of the processing intervals, and no audio data is processed during the sleep intervals. Selectable benchmarking parameters may determine the duty cycle and/or block size, typically to enable a user to select parameters which cause the average throughput rate and block size (of the burst mode benchmarking operation) to match that expected when a contemplated deployed system runs the APA which is benchmarked or an APA similar thereto (or in the case that the APA is a node, a counterpart APA which corresponds to the node which is benchmarked). For example, a menu of selectable benchmarking parameters (e.g., provided by user interface 50 of FIG. 1 or subsystem 11 of FIG. 2) may indicate a set of selectable synthetic APAs (having different levels of complexity), and selection of one of the synthetic APAs for benchmarking may determine the duty cycle and block size to be employed during the benchmarking (where the duty cycle and block size have been predetermined so that execution of the selected synthetic APA during the benchmarking emulates execution of the selected synthetic APA by a contemplated deployed system). In another example, a menu of selectable benchmarking parameters (e.g., provided by user interface 50 of FIG. 1 or subsystem 11 of FIG. 2) indicates both a set of selectable synthetic APAs (typically having different levels of complexity), and a set of selectable duty cycle and/or block size parameters (so that the user can select a desired combination of the APA to be benchmarked and duty cycle and/or block size parameters to be employed during the benchmarking to emulate execution of the APA by a contemplated deployed system). The burst mode operation could (and typically would) simulate execution of the APA (or an APA similar thereto) by a contemplated deployed system with expected throttling of processor (e.g., CPU) voltage and/or processing rate or frequency (e.g., expected throttling up to a maximum, followed by throttling back down if and when measured processor temperature rises faster than heat can be dissipated). Typically, the burst mode operation comprises a sequence of short processing intervals (in which small blocks of audio data are processed) evenly spread through time in order to keep signal output buffers from emptying.

In typical operation of the FIG. 1 (or FIG. 2) system, the system provides user controls which enable a user to perform benchmarking of an APA (e.g., a node) conveniently and in a manner (sometimes referred to herein as a "real time mode") which simulates (e.g., simulates or mimics as a result of user choice of user-specifiable benchmarking parameters) expected real time operation of a contemplated deployed system running the APA (or in the case that the APA is a node, a contemplated deployed system running a counterpart APA which corresponds to the node). The resulting benchmarks are thus usable to assess expected operation (in real deployment) of systems which execute the benchmarked APA (or APAs similar thereto). In typical operation, the FIG. 1 (or FIG. 2) system is useful to benchmark a variety of different APAs (e.g., a variety of selectable combinations of a selected audio decoding node, executed by subsystem 5 of FIG. 2 to process an input audio file, and a selected audio post processing node (executed by subsystem 7 of FIG. 2 to process the output of the decoding node) running in sequence with the post processing node). In some embodiments, a user control is provided (e.g., provided by subsystem 11 of FIG. 2) which allows selection of any one of at least two available audio decoding nodes (algorithms of a type normally implemented by an audio codec), and/or any one of at least two available audio post processing nodes (algorithms of a type normally implemented by an audio post-processor), and/or any one of at least two available combinations of audio decoding nodes and audio post processing nodes (e.g., an audio decoding node running in sequence with an audio post processing node).

The FIG. 2 system may be operated to perform an embodiment of the inventive method for benchmarking which includes a step of determining a synthetic APA ("node") which corresponds to a counterpart APA (a functional APA, intended for real use by a first deployed system). Each such node may be predetermined, and code for executing each such node in subsystem 5 and/or subsystem 7 may be stored in memory 13. A menu of selectable benchmarking parameters provided by subsystem 11 may indicate a set of selectable ones of the nodes (for which predetermined executable code has been stored in 13), and optionally also a set of selectable duty cycle and/or block size parameters (so that the user can select a desired node to be benchmarked and duty cycle and/or block size parameters to be employed during the benchmarking to emulate execution of the node by a contemplated deployed system).

Each node executable by the FIG. 2 system may emulate a complete reference APA (reference code), in the sense that execution of the node emulates at least important ones of the performance characteristics of execution, by the FIG. 2 system, of the reference code. The reference APA may be a decoding method or an audio post-processing method (or a decoding method, and an audio post-processing method which processes the decoded audio output of the decoding method).

For example, in some implementations of the FIG. 2 system, subsystem 11 provides user controls which allow selection (for benchmarking) of any one of a set of predetermined nodes including the following:

a first node (having a lowest level of complexity) which emulates a first reference APA which is a first decoding method having a lowest level of complexity (e.g., conventional enhanced AC3 (E-AC3) decoding of a 7.1 channel audio program (including 7 full frequency range channels) and a first audio post-processing method which processes the decoded audio output of the first decoding method;

a second node which emulates a second reference APA (having a higher level of complexity than the first reference APA), where the second reference APA is a second decoding method having a higher level of complexity than the first decoding method, followed by the first audio post-processing method (the same audio post-processing method emulated by the first node) which processes the decoded audio output of the second decoding method. For example, the second decoding method may generate an M-channel decoded output (comprising M speaker channels, where M is greater than 2) by decoding an object-based encoded audio program, where the object-based encoded audio program comprises 8 audio object channels, and a set of speaker channels in 7.1 channel format (i.e., including 7 full frequency range speaker channels), the speaker channels having been encoded in accordance with E-AC3 encoding;

a third node which emulates a third reference APA (having a higher level of complexity than the second reference APA), where the third reference APA is the second decoding method (the same decoding method emulated by the second node), followed by a second audio post-processing method (having a higher level of complexity than the first audio post-processing method) which processes the decoded audio output of the second decoding method. For example, the second audio post-processing method may perform all the processing performed by the first audio post-processing method (on the M-channel decoded output of the second decoding method) to generate M-channel post-processed audio (where M is greater than 2), and also implement a headphone virtualizer which generates a two-channel virtualized output in response to the M-channel post-processed audio; and a fourth node which emulates a fourth reference APA (having a higher level of complexity than the third reference APA), where the fourth reference APA is a third decoding method having a higher level of complexity than the second decoding method, followed by the second audio post-processing method (the same audio post-processing method emulated by the third node) which processes the decoded audio output of the third decoding method. For example, the third decoding method may generate an M-channel decoded output (comprising M speaker channels) by decoding an object-based encoded audio program, where the object-based encoded audio program comprises 16 audio object channels, and a set of speaker channels in 7.1 channel format (i.e., including 7 full frequency range speaker channels), the speaker channels having been encoded in accordance with E-AC3 encoding.

The FIG. 2 system is typically implemented with code (e.g., code pre-stored in memory 13) which is executable by subsystem 5 during benchmarking to perform any selected one of the first decoding method, the second decoding method, and the third decoding method, and code (e.g., code pre-stored in memory 13) which is executable by subsystem 7 during benchmarking to perform any selected one of the first audio post-processing method and the second audio post-processing method. In response to user selection of the above-described "first node," during benchmarking, subsystem 5 executes the first decoding method to process input audio, and subsystem 7 executes the first audio post-processing method to process the output of subsystem 5. In response to user selection of the above-described "second node," during benchmarking, subsystem 5 executes the second decoding method to process input audio, and subsystem 7 executes the first audio post-processing method to process the output of subsystem 5. In response to user selection of the above-described "third node," during benchmarking, subsystem 5 executes the second decoding method to process input audio, and subsystem 7 executes the second audio post-processing method to process the output of subsystem 5. In response to user selection of the above-described "fourth node," during benchmarking, subsystem 5 executes the third decoding method to process input audio, and subsystem 7 executes the second audio post-processing method to process the output of subsystem 5.

Preferably, the FIG. 2 system is implemented so that subsystem 11 provides user controls which allow selection (for execution during benchmarking) of one of the following variations on the above-described first node, second node, third node, and fourth node:

a simplified version of the first node which emulates only the first decoding method (i.e., by enabling operation of subsystem 5, and disabling subsystem 7, so that subsystem 7 does not execute the first audio post-processing method and subsystem 5 executes the first decoding method during benchmarking);

a second simplified version of the first node (useful if the audio data to be processed during benchmarking is indicative of a decoded 7.1 channel audio program) which emulates only the first audio post-processing method (i.e., by disabling operation of subsystem 5, and enabling operation of subsystem 7, so that subsystem 7 executes the first audio post-processing method but subsystem 5 does not execute the first decoding method during benchmarking);

a simplified version of the second node which emulates only the second decoding method (i.e., by enabling operation of subsystem 5, and disabling subsystem 7, so that subsystem 7 does not execute the first audio post-processing method and subsystem 5 executes the second decoding method during benchmarking); and a simplified version of the third node (useful if the audio data to be processed during benchmarking is indicative of decoded M-channel audio, comprising M speaker channels) which emulates only the second audio post-processing method (i.e., by disabling operation of subsystem 5, and enabling operation of subsystem 7, so that subsystem 7 executes the second audio post-processing method but subsystem 5 does not execute the second decoding method during benchmarking); and a simplified version of the fourth node which emulates only the third decoding method (i.e., by enabling operation of subsystem 5, and disabling subsystem 7, so that subsystem 7 does not execute the second audio post-processing method and subsystem 5 executes the third decoding method during benchmarking).

In some embodiments which determine and/or benchmark a "node" (synthetic APA), the node is determined so as to correspond to a secret counterpart APA (which is desired to be kept as a secret). The node can then be disseminated to users (with software for programming a system to perform an embodiment of the inventive benchmarking method) to allow benchmarking of user-determined counterpart APAs which correspond (or are similar) to the node and to the secret counterpart APA (or benchmarking of APAs including such user-determined counterpart APAs), and are intended to run on a variety of contemplated deployed systems. This can be accomplished without actually disseminating the secret counterpart APA. For example, in some implementations of FIG. 2 (which determine and/or benchmark a node), the node may be determined (and code for executing the node in subsystem 5 and/or subsystem 7 may be stored in memory 13) so as to call signal processing functions (also stored as a library in memory 13) in a similar way as does the reference code (where the reference code may be desired to be kept as a secret), but with the key difference that the node simulates the performance characteristics of the reference code without actually implementing the same algorithms as does the reference code. In this way, the node (and the method of benchmarking the node) can be modified (e.g., improved) independently of the reference code, and the node can be more freely distributed than the reference code.

In operation of typical implementations of the FIG. 2 system, a selected node is benchmarked while the system executes the node in a manner which simulates (e.g., as a result of user selection of selectable benchmarking parameters) expected real time execution of the node by a contemplated second deployed system which executes the node. The contemplated second deployed system is an audio processing system contemplated for deployment (or expected to be deployed) by an end user, which can be but need not be identical to the above-mentioned first deployed system. The node is determined such that, when the node is benchmarked by the FIG. 2 system (in accordance with a set of benchmarking parameters), the resulting benchmark matches (is at least substantially the same as) the benchmark which would be determined by the FIG. 2 system as a result of benchmarking the corresponding counterpart APA in accordance with the same benchmarking parameters. Thus, the node can be determined so as to correspond to a secret counterpart APA (which is desired to be kept as a secret). The node can then be disseminated to users (with software for programming the FIG. 2 system to perform an embodiment of the inventive benchmarking method) to allow benchmarking of user-determined counterpart APAs which correspond (or are similar) to the node and to the secret counterpart APA and are intended to run on a variety of contemplated deployed systems (or benchmarking of APAs including such user-determined counterpart APAs), without actually disseminating the secret counterpart APA.

Typically, during benchmarking of a node, the FIG. 2 system executes the node in a burst mode, in the sense that it processes blocks (bursts) of audio data in a sequence of processing intervals separated by sleep intervals, wherein a block of the audio data is processed during each of the processing intervals, and no audio data is processed during the sleep intervals. Subsystem 11 preferably provides a menu of selectable benchmarking parameters which can be selected to determine the duty cycle and/or block size, typically so that the average throughput rate and block size (of the burst mode operation) match that expected when the contemplated second deployed system runs the node (or a counterpart APA which corresponds to the node).

A node executed by the FIG. 2 (or FIG. 1) system may include (or even consist primarily of) calls to code, for implementing signal processing functions, which is assumed to be stored in a library (e.g., in memory 13 of the FIG. 2 system), so that execution of the node by the system includes calls to code (stored in a memory of the system) which is executed to cause the system to perform a sequence of the signal processing functions. In this case, execution of the node (by the benchmarking system) preferably mimics the dynamic workload and memory requirements of execution of the corresponding counterpart APA (e.g., the number and sequence of calls by the node to processing functions in a library of the benchmarking system matches the number and sequence of calls by the corresponding counterpart APA to corresponding processing functions in a library of the first deployed system). Examples of signal processing functions which may be called by APAs include (but are not limited to) FFTs, filters, mixers, and vector multiplication.

In some embodiments, the inventive benchmarking method is implemented by an audio processor (e.g., processor 40 of FIG. 1 or processor 3 of FIG. 2) programmed (in accordance with the invention) with benchmarking software of a type conventionally referred to "command line only" software (i.e., the programmed processor executes the benchmarking software to perform benchmarking in response to user commands entered as lines of text). In other embodiments, the processor is programmed (in accordance with the invention) with benchmarking software which implements a graphic user interface (GUI) usable by the user to control performance of the inventive benchmarking method. For example, the inventive system may be implemented by programming a conventional processor (e.g., smart phone or other mobile device) with an embodiment of benchmarking software which includes a GUI usable to control performance of the inventive method, although the operating system of the conventional processor does not permit running benchmarking software with a command line interface. In the latter example, the benchmarking software would itself implement a GUI, and the user would employ this GUI to control the programmed system to perform benchmarking in accordance with the invention.

In some embodiments, the inventive benchmarking method and system provides a batch mode of operation in which equivalent functionality can be achieved via a command line instantiation of the benchmark framework. A command line executable may be the only way the benchmarking method can interact with (and be implemented by) some processor boards, whereas for some other processors (e.g., in some mobile devices) a GUI is the only way in which the benchmarking method can interact with (and be implemented by) such processors.

In some embodiments, the inventive benchmarking method and system provides one or more of the following user controls:

at least one control (e.g., the above-mentioned "complexity user dial" control) which allows user selection (preferably conveniently and easily) of selectable versions of the APA (e.g., synthetic APA) to be benchmarked (e.g., versions with selected audio processing operations enabled ("on") or disabled ("off") but with everything else the same), and measurement of power consumed by each selected version of the APA during benchmarking;

at least one complexity control (e.g., the above-mentioned "complexity user dial" control, which may select between the "first node," "second node," "third node," and "fourth node" in the above-described exemplary implementation of the FIG. 2 system) that allows user selection of an APA to be benchmarked from a menu of selectable APAs having different levels of complexity. The user is typically provided with an indication of the complexity (e.g., workload and memory footprint) of each selectable APA, and the menu may present the selectable APAs in complexity order (e.g., an indication is provided of representative workloads and memory footprints of the APAs in complexity order). The selectable APAs may correspond to (e.g., they may be synthetic APAs which emulate) a range of technologies and typical use-cases, and the menu of selectable APAs may provide (or enable provision of) a "Capability Level" description of target processors (audio processors which are expected to be deployed by end users) which indicates which level of technology complexity can be accommodated efficiently by each target processor and which target processors (if any) may have unacceptable performance (when running specified APAs) due to excessive memory bus cycles or other factors.

In typical embodiments, the inventive benchmarking software supports the inputting of audio files and the outputting of processed audio files after a selected APA has been executed (i.e., has undergone benchmarking while it processed the audio data).

In some embodiments, the inventive benchmarking method generates a benchmark (e.g., a benchmark indicated by data in memory 68 of FIG. 1 or buffer 17 of FIG. 2) indicative of complexity measurements on a selected and benchmarked APA. For example, an exemplary embodiment of the benchmarking method generates a benchmark which is indicative of all or some of the following complexity measurements (as well as power consumption and optionally also other measured values) regarding a benchmarked APA:

processor usage (e.g., average MCPS (Million Cycles Per Second), and/or CPI (Cycles per instruction) required for generation of output audio 9 in response to input audio 1 by the FIG. 2 system); and memory usage (e.g., Code size (Kbytes), Static memory (Kbytes), Dynamic memory (Kbytes), and Stack size (Kbytes) used to generate output audio 9 in response to input audio 1 by the FIG. 2 system).

Preferably, the inventive method determines a benchmark (e.g., a benchmark indicated by data in buffer 17 of FIG. 2) which is indicative of a decoding node (e.g., executed by subsystem 5 of FIG. 2) and a post processing node (e.g., executed by subsystem 7 of FIG. 2) separately even if both nodes are executed concurrently during the benchmarking operation. Preferably the benchmark is indicated by data collected in a log file and stored for future reference. Preferably, the benchmark is indicative of statistics reported on a block by block basis as well as an average and peak information, and is indicative of power consumption (e.g., measured in milliwatts) and latency (e.g., measured in milliseconds) required for generation of output audio in response to input audio.

It is contemplated that some embodiments of benchmarking software employed to program an audio processor in accordance with the invention are executable by a mobile operating system (e.g., Android) or are compatible with (e.g., are C code compatible with) Linux or another conventional operating system.

In some embodiments, the inventive method is performed by an audio processor programmed (in accordance with the invention) with benchmarking software to:

(a) in response to selected input audio data (e.g., a set of input audio bitstreams indicative of a selected set of audio channels) and a user command (a start or play command entered via a GUI or other user interface), cause a transport system to play the audio data continuously in a loop (for processing in a loop by an APA being benchmarked). In some cases, it may be preferable that bitstreams are not indicative of whole blocks, so that block time-alignment idiosyncrasies are evened out. The benchmarking software decides on a system-appropriate processing block size, which may or may not correspond to an underlying processing block size;

(b) initialize (and configure as appropriate) the selected APA to be benchmarked (e.g., an audio decoding node (e.g., for execution by subsystem 5 of FIG. 2) and/or audio post processing node (e.g., for execution by subsystem 7 of FIG. 2));

(c) apply the selected APA (e.g., node(s)) to the audio data for each OS-sized block of audio data and then put the APA to sleep for long enough for the average overall processing rate to match expected real-time average throughput.

Examples of ways to implement this timing control (i.e., control of the duty cycle of bursts of audio data processing with each burst followed by a sleep interval) to achieve an average throughput processing rate (expected in real execution by a contemplated deployed processor) include the following:

perform benchmarking by executing the APA (e.g., synthetic APA) to be benchmarked on the actual processor contemplated for deployment by the end user (or a processor whose operating characteristics are known to match that of the contemplated deployed processor). While doing so, rely on the processor's actual output calls to implement the timing control (each output call being recognized as an instance of the start of a new cycle of processing of a burst of audio data by the APA being benchmarked). For example, at a specific sub interval of the audio clock rate (e.g., once per each interval of 512/48000 sec, where the sample rate is 48 kHz), the calling program may need to provide a new block of audio data (comprising 512 samples) for processing, and thus the processing is performed on 512 sample bursts audio data with the benchmarking software aware of the timing of the start of each new cycle of processing of a burst. This technique may have the advantage of fitting the audio processing operation (during benchmarking) into whatever real-time audio priority state the OS has available for this case; or perform benchmarking by executing the APA to be benchmarked on a processor other than that contemplated for deployment by the end user, but with knowledge of the expected operating characteristics of the contemplated deployed processor. In this case, the duty cycle (for each relevant pair of APA to be benchmarked, and contemplated deployed processor) would typically be configured as part of the benchmark system setup. After setup, the benchmark system user would typically not need to modify it. During setup, the benchmarking system could be configured to control the duty cycle of bursts of audio data processing (with each burst followed by a sleep interval) to achieve the average throughput processing rate expected in real execution of the relevant APA by a contemplated deployed processor, in any of a variety of ways including the following:

use an OS blocking call with a small enough time-out (e.g., select( ), poll( ), or the like);

use a software phase-locked-loop adaptation to tune the desired sleep time to keep a steady processing rate;

use an OS-provided recurring timer (e.g., setitimer( )/sigwait( ); or block on a thread-semaphore and have another thread that runs a timer as above and sends a signal at the correct intervals.

In some embodiments, the inventive benchmarking method includes one or more of the following steps:

query the dlb_intrinsics/instrument/profiling state, and log the state after every completion of processing of each block of audio data (by the APA being benchmarked). If available, system information such as instantaneous CPU frequency and processor ID are also logged, along with other useful information from processor status registers, such as cache miss counts. In a local-only operation mode, this information may be logged to a circular buffer large enough for the needs of displays on a GUI;

in response to a user "stop" command (or other state change command entered via a GUI or other user interface), cause capture of the current profiling state from the circular log buffer into another log, annotated with the particular state or configuration. This roll-up profiling data, along with identifying information for the APA and contemplated deployed processor under test, and possibly an ID of the user, can be logged over a network to a database system;

a GUI (or other user interface) provides a periodically updated display of all or a subset of the useful performance statistics, so that the users can make manual notes or check the behavior against their expectations; and the benchmarking process continues indefinitely (with updating of benchmarking data from time to time) or until the user explicitly terminates it. This would allow battery run-down tests and use of physical power-measurement jigs or OS-level profiling instrumentation.

Typical embodiments of the invention are expected to have useful commercial applications including the following:

SOC Hardware Architect Use: Within every silicon company reside a number of hardware architects that design the next generation of SOC (system on a chip) devices. They architect the layout of each key component of the device including multiple CPUs, interconnect bus systems, memory subsystems and memory interfaces (e.g., to externally DDR3/4 memory devices). It is contemplated that these individuals would leverage benchmarks determined in accordance with embodiments of the invention to profile how their future architectures improve the power efficiency, latency, computing requirements and potential cache misses of future audio technology (e.g., the benchmarked APAs). These individuals typically have simulators that enable them to experiment with architecture trade offs and study how the results will vary given a specific benchmark. A benchmark determined in accordance with typical embodiments would be a simple to use benchmark that can be easily plugged into their current infrastructure to enable them to understand the tradeoffs for their current architecture decisions and adjustments;

SW Compiler Engineer use: Typical CPU based SOC and CPU IP providers have teams dedicated to compiler development. These compilers take generic or hand crafted code (e.g., C code) and compile the code down to machine code for a specific instruction set and SOC. Making these compilations as efficient as possible is crucial in order to reduce memory footprint, compute complexity, cache misses and power consumption. Often the examples that compiler teams use to optimize their compilers for audio code are outdated and do not reflect the advanced nature of the audio algorithms that will be coming to market in the next 12 months.

A benchmark suite generated in accordance with typical embodiments of the invention will enable compiler engineers to profile changes in their compiler and also to actually measure the power consumption on existing target SOCs that have evaluation platforms available in the market. The result will enable them to release compilers that are more efficient than previous generations and can demonstrate the actual differences;

Micro architecture IP Architect use: Within typical CPU IP and DSP IP companies or groups reside a number of CPU/DSP and memory bus microarchitecture architects that design the next generation of CPU/DSP devices. Similar to the SOC hardware architects these individuals could leverage benchmarks determined in accordance with embodiments of the invention to profile how their future architectures improve the power efficiency, latency, compute requirements and cache misses of future technology which is similar to the benchmarked technology. These individuals typically have and use RTL simulators coupled with power simulators that enable them to experiment with architecture trade offs and study how the results will vary given a specific benchmarked APA;

CPU SOC Benchmark Technical Marketing Engineer use: Benchmarking of current SOC devices released to market is very common and an active area of marketing differentiation. Technical marketing engineers are often assigned to ensuring the benchmarking for performance and power is done and publishing results to target customers. Benchmarks generated in accordance with typical embodiments will provide these individuals with benchmarks that are much more pertinent to audio technologies that are available in the market today and communicate and demonstrate the benefits of their technology with regard to audio.

Other aspects of the invention include:

a system or device including a memory (e.g. memory 13 of an implementation of the FIG. 2 system in which selectable pre-determined nodes are stored) which stores (e.g., in a non-transitory manner) data indicative of at least one synthetic APA determined in accordance with any embodiment of the inventive method or steps thereof;

a system or device including a memory (e.g. buffer 17 of FIG. 2, or memory 68 of the FIG. 1 system) which stores (e.g., in a non-transitory manner) data indicative of at least one benchmark (i.e., data indicative of a benchmark) generated by, any embodiment of the inventive method or steps thereof; and a computer readable medium (e.g., a disc) which stores code (e.g., in a non-transitory manner) for implementing any embodiment of the inventive method or steps thereof. Examples of such a medium include: computer-readable medium 100 of FIG. 3 which is a disc which stores (in a non-transitory manner) computer-executable code for implementing (e.g., programming a processor to perform) an embodiment of the inventive benchmarking method; and memory 13 (of an implementation of the FIG. 2 system) in which selectable pre-determined nodes are stored.

Embodiments of the invention may be implemented in hardware, firmware, or software, or a combination thereof (e.g., as a programmable logic array). For example, processor 40 of FIG. 1 or processor 3 of FIG. 2 may be implemented in appropriately programmed (or otherwise configured) hardware or firmware, e.g., as a programmed general purpose processor, digital signal processor, or microprocessor. Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., a computer system which implements the system of FIG. 1 or the system of FIG. 2), each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on (e.g., in a non-transitory manner) or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing in a non-transitory manner) a computer program, where the storage medium so configured causes a computer system to operate in a specific and predefined manner to perform the functions described herein.

While implementations have been described by way of example and in terms of exemplary specific embodiments, it is to be understood that implementations of the invention are not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for benchmarking an audio processing algorithm ("APA"), wherein the APA is a synthetic APA which corresponds to a counterpart APA, where the counterpart APA is a functional APA intended for real use by a first deployed system, including steps of:

(a) operating an audio processor to execute the APA, including by processing audio data, in a manner which simulates expected real time operation of a contemplated deployed system which executes the APA, wherein the processing of the audio data in step (a) is performed in a burst mode comprising a sequence of processing intervals separated by sleep intervals, wherein a block of the audio data is processed during each of the processing intervals, and no block of the audio data is processed during the sleep intervals, and wherein step (a) is performed in accordance with at least one benchmarking parameter determined by user selection from selectable benchmarking parameters including at least one of a duty cycle for the burst mode or a block size for the burst mode; and (b) while performing step (a), generating benchmarking data indicative of at least one performance characteristic of the APA during processing of the audio data, whereby the benchmarking data determine a benchmark of the APA.

2. The method of claim 1, wherein the synthetic APA is such that operation of the audio processor to execute the counterpart APA to process the audio data in accordance with a set of benchmarking parameters in a manner which simulates expected real time operation of the contemplated deployed system which executes the counterpart APA, while determining counterpart APA benchmarking data indicative of the at least one performance characteristic of the counterpart APA during processing of the audio data, would result in said counterpart APA benchmarking data determining a counterpart APA benchmark which matches the benchmark determined in step (b) while operating the audio processor to execute the synthetic APA to process the audio data in accordance with the set of benchmarking parameters in said manner which simulates expected real time operation of the contemplated deployed system which executes the synthetic APA.

3. The method of claim 1, wherein the synthetic APA is a user-selected synthetic APA, and wherein the method includes a step of:
providing a user control which enables user selection of at least one of at least two selectable synthetic APAs, and responding to user selection of said user-selected synthetic APA from among the selectable synthetic APAs by configuring the audio processor to execute said user-selected synthetic APA.

4. The method of claim 1, wherein the APA is a user-selected APA, and wherein the method includes a step of:
providing at least one complexity control that enables user selection of at least one selectable APA from a menu of selectable APAs having different levels of complexity, and responding to user selection of said user-selected APA from among the selectable APAs by configuring the audio processor to execute said user-selected synthetic APA.

5. The method of claim 1, wherein the synthetic APA is a user-selected synthetic APA, and wherein the method includes a step of:
providing at least one complexity control that enables user selection of at least one selectable synthetic APA from a menu of selectable synthetic APAs having different levels of complexity, and responding to user selection of said user-selected synthetic APA from among the selectable synthetic APAs by configuring the audio processor to execute said user-selected synthetic APA.

6. A benchmarking method, including steps of:
(a) determining a synthetic audio processing algorithm ("synthetic APA") which corresponds to a counterpart APA, wherein the counterpart APA is an audio processing algorithm ("APA") intended for real use by a contemplated first deployed system;
(b) determining a benchmark of the synthetic APA as a result of benchmarking the synthetic APA while said synthetic APA is executed by a benchmarking system in a manner which simulates expected real time operation of a contemplated second deployed system which executes said synthetic APA;
wherein the benchmarking system is or includes an audio processor, and wherein step (b) includes steps of:
(c) operating the audio processor to execute the synthetic APA, including by processing audio data in a manner which simulates expected real time operation of the contemplated second deployed system which executes the synthetic APA, wherein the processing of the audio data in step (c) is performed in a burst mode comprising a sequence of processing intervals separated by sleep intervals, wherein a block of the audio data is processed during each of the processing intervals, and no block of the audio data is processed during the sleep intervals, and wherein step (c) is performed in accordance with at least one benchmarking parameter determined by user selection from selectable benchmarking parameters, wherein the selectable benchmarking parameters include at least one of a duty cycle for the burst mode or a block size for the burst mode; and
(d) while performing step (c), generating benchmarking data indicative of at least one performance characteristic of the synthetic APA during processing of the audio data, whereby the benchmarking data determine said benchmark of the synthetic APA.

7. The method of claim 6, wherein the synthetic APA is such that operation of the audio processor to execute the counterpart APA to process the audio data in accordance with a set of benchmarking parameters in a manner which simulates expected real time operation of the contemplated first deployed system which executes the counterpart APA, while determining counterpart APA benchmarking data indicative of the at least one performance characteristic of the counterpart APA during processing of the audio data, would result in said counterpart APA benchmarking data determining a counterpart APA benchmark which matches the benchmark determined in step (b) while operating the audio processor to execute the synthetic APA to process the audio data in accordance with the set of benchmarking parameters in said manner which simulates expected real time operation of the contemplated second deployed system which executes the synthetic APA.

8. The method of claim 6, wherein the synthetic APA is a user-selected synthetic APA, and wherein the method includes a step of:
providing a user control which enables user selection of any one of at least two selectable synthetic APAs, and responding to user selection of said user-selected synthetic APA from among the selectable synthetic APAs by configuring the audio processor to execute said user-selected synthetic APA.

9. The method of claim 6, wherein the synthetic APA is a user-selected synthetic APA, and said method includes a step of:
providing at least one complexity control that enables user selection of at least one selectable synthetic APA from a menu of selectable synthetic APAs having different levels of complexity, and responding to user selection of said user-selected synthetic APA from among the selectable synthetic APAs by configuring the audio processor to execute said user-selected synthetic APA.

10. The method of claim 6, wherein the synthetic APA includes calls to code, for implementing signal processing functions, which is assumed to be stored in a memory of the benchmarking system, execution of the synthetic APA by the benchmarking system includes calls to at least some of the code, and said at least some of the code is executed during step (b) to cause the benchmarking system to perform a sequence of the signal processing functions.

11. An audio benchmarking system configured to benchmark an audio processing algorithm ("APA"), wherein the APA is a synthetic APA which corresponds to a counterpart APA, where the counterpart APA is a functional APA intended for real use by a first deployed system, said system including:
- an audio processor, coupled and configured to execute the APA, including by processing audio data, in a manner which simulates expected real time operation of a contemplated deployed system which executes the APA, wherein the audio processor is configured to process the audio data in a burst mode comprising a sequence of processing intervals separated by sleep intervals, wherein a block of the audio data is processed during each of the processing intervals, and no block of the audio data is processed during the sleep intervals, and the audio processor is configured to process the audio data in accordance with at least one benchmarking parameter determined by user selection from selectable benchmarking parameters including at least one of a duty cycle for the burst mode or a block size for the burst mode; and
- a second subsystem, coupled and configured to generate benchmarking data indicative of at least one performance characteristic of the APA during processing of the audio data by the audio processor, whereby the benchmarking data determine a benchmark of the APA.

12. The system of claim 11, wherein the synthetic APA is such that operation of the audio processor to execute the counterpart APA to process the audio data in accordance with a set of benchmarking parameters in a manner which simulates expected real time operation of the contemplated deployed system which executes the counterpart APA, while the second subsystem determines counterpart APA benchmarking data indicative of the at least one performance characteristic of the counterpart APA during processing of the audio data, would result in said counterpart APA benchmarking data determining a counterpart APA benchmark which matches the benchmark determined by the second subsystem while the audio processor executes the synthetic APA to process the audio data in accordance with the set of benchmarking parameters in said manner which simulates expected real time operation of the contemplated deployed system which executes the synthetic APA.

13. The system of claim 11, wherein the synthetic APA is a user-selected synthetic APA, and said system also includes:
- a user interface coupled and configured to provide a user control which enables user selection of at least one of at least two selectable synthetic APAs, and wherein said system is configured to respond to user selection of said user-selected synthetic APA from among the selectable synthetic APAs by configuring the audio processor to execute said user-selected synthetic APA.

14. The system of claim 11, wherein the synthetic APA is a user-selected synthetic APA, and said system also includes:
- a user interface coupled and configured to provide at least one complexity control that enables user selection of at least one selectable synthetic APA from a menu of selectable synthetic APAs having different levels of complexity, and wherein said system is configured to respond to user selection of said user-selected synthetic APA from among the selectable synthetic APAs by configuring the audio processor to execute said user-selected synthetic APA.

15. The system of claim 11, wherein the APA is a user-selected APA, and said system also includes:
- a user interface coupled and configured to provide at least one complexity control that enables user selection of at least one selectable APA from a menu of selectable APAs having different levels of complexity, and wherein said system is configured to respond to user selection of said user-selected APA from among the selectable APAs by configuring the audio processor to execute said user-selected APA.

16. An audio benchmarking system configured to benchmark a synthetic audio processing algorithm ("synthetic APA") which corresponds to a counterpart APA, wherein the counterpart APA is an audio processing algorithm ("APA") intended for real use by a contemplated first deployed audio processor, said audio benchmarking system including:
- an audio processor, coupled and configured to execute the synthetic APA, including by processing audio data, in a manner which simulates expected real time operation of a contemplated second deployed audio processor which executes the synthetic APA, wherein the audio processor is configured to process the audio data in a burst mode comprising a sequence of processing intervals separated by sleep intervals, wherein a block of the audio data is processed during each of the processing intervals, and no block of the audio data is processed during the sleep intervals, and the audio processor is configured to process the audio data in accordance with at least one benchmarking parameter determined by user selection from selectable benchmarking parameters including at least one of a duty cycle for the burst mode or a block size for the burst mode; and
- a second subsystem, coupled and configured to generate benchmarking data indicative of at least one performance characteristic of the synthetic APA during processing of the audio data by the audio processor, whereby the benchmarking data determine a benchmark of the synthetic APA.

17. The system of claim 16, wherein the synthetic APA is such that operation of the audio processor to execute the counterpart APA to process the audio data in accordance with a set of benchmarking parameters in a manner which simulates expected real time operation of the contemplated first deployed audio processor which executes the counterpart APA, while the second subsystem determines counterpart APA benchmarking data indicative of the at least one performance characteristic of the counterpart APA during processing of the audio data, would result in said counterpart APA benchmarking data determining a counterpart APA benchmark which matches the benchmark determined by the second subsystem while the audio processor executes the synthetic APA to process the audio data in accordance with the set of benchmarking parameters in said manner which simulates expected real time operation of the contemplated second deployed audio processor which executes the synthetic APA.

18. The audio benchmarking system of claim 16, wherein the synthetic APA is a user-selected synthetic APA, and said audio benchmarking system also includes:
- a user interface coupled and configured to provide a user control which enables user selection of at least one of at least two selectable synthetic APAs, and wherein said audio benchmarking system is configured to respond to user selection of said user-selected synthetic APA from among the selectable synthetic APAs by configuring the audio processor to execute said user-selected synthetic APA.

19. The audio benchmarking system of claim 16, wherein the synthetic APA is a user-selected synthetic APA, and said audio benchmarking system also includes:
- a user interface coupled and configured to provide at least one complexity control that enables user selection of at least one selectable synthetic APA from a menu of selectable synthetic APAs having different levels of complexity, and wherein said audio benchmarking system is configured to respond to user selection of said user-selected synthetic APA from among the selectable synthetic APAs by configuring the audio processor to execute said user-selected synthetic APA.

20. A computer readable medium which stores, in a non-transitory manner, computer-executable code for programming a processing system, which is or includes an audio processor, to perform benchmarking of an audio processing algorithm ("APA") including by:
- (a) operating the audio processor to execute the APA, including by processing audio data, in a manner which simulates expected real time operation of a contemplated deployed system which executes the APA; and
- (b) while performing step (a), generating benchmarking data indicative of at least one performance characteristic of the APA during processing of the audio data, whereby the benchmarking data determine a benchmark of the APA;

wherein the computer-executable code includes code for programming the processing system such that the processing of the audio data in step (a) is performed in a burst mode comprising a sequence of processing intervals separated by sleep intervals, wherein a block of the audio data is processed during each of the processing intervals, and no block of the audio data is processed during the sleep intervals, and step (a) is performed in accordance with at least one benchmarking parameter determined by user selection from selectable benchmarking parameters including at least one of a duty cycle for the burst mode or a block size for the burst mode; and wherein the computer-executable code includes code for programming the processing system such that the APA is a user-selected synthetic APA which corresponds to a counterpart APA, where the counterpart APA is a functional APA intended for real use by a first deployed system, and such that the benchmarking of the APA includes a step of:

providing a user control which enables user selection of at least one of at least two selectable synthetic APAs, and responding to user selection of said user-selected synthetic APA from among the selectable synthetic APAs by configuring the audio processor to execute said user-selected synthetic APA.

21. A computer readable medium which stores, in a non-transitory manner, computer-executable code for programming a processing system, which is or includes an audio processor, to perform benchmarking of a synthetic audio processing algorithm ("synthetic APA") which corresponds to a counterpart APA, where the counterpart APA is an audio processing algorithm ("APA") intended for real use by a contemplated first deployed system, such that the benchmarking of the synthetic APA includes steps of:
- (a) operating the audio processor to execute the synthetic APA, including by processing audio data in a manner which simulates expected real time operation of a contemplated second deployed system which executes the synthetic APA, wherein the computer-executable code includes code for programming the processing system such that the processing of the audio data in step (a) is performed in a burst mode comprising a sequence of processing intervals separated by sleep intervals, wherein a block of the audio data is processed during each of the processing intervals, and no block of the audio data is processed during the sleep intervals, and step (a) is performed in accordance with at least one benchmarking parameter determined by user selection from selectable benchmarking parameters, wherein the selectable benchmarking parameters include at least one of a duty cycle for the burst mode or a block size for the burst mode; and
- (b) while performing step (a), generating benchmarking data indicative of at least one performance characteristic of the synthetic APA during processing of the audio data, whereby the benchmarking data determine a benchmark of the synthetic APA.

22. The medium of claim 21, wherein the computer-executable code includes code for programming the processing system such that the synthetic APA is a user-selected synthetic APA, and such that the benchmarking of the synthetic APA includes a step of:

providing a user control which enables user selection of any one of at least two selectable synthetic APAs, and responding to user selection of said user-selected synthetic APA from among the selectable synthetic APAs by configuring the audio processor to execute said user-selected synthetic APA.

* * * * *